United States Patent [19]

Kondur, Jr. et al.

[11] 3,780,264

[45] Dec. 18, 1973

[54] ELECTROMAGNETIC READ/WRITE APPARATUS FOR STATIONARY CARDS

[75] Inventors: Nicholas Kondur, Jr., Rolling Meadows, Ill.; Lawrence P. Kobylarz, Howell, Mich.

[73] Assignee: Burroughs Corporation, Detroit, Mich.

[22] Filed: Mar. 3, 1971

[21] Appl. No.: 120,457

[52] U.S. Cl. .................... 235/61.11 D, 235/61.12 M
[51] Int. Cl. .............................................. G06k 7/08
[58] Field of Search .............. 235/61.11 A, 61.11 C, 235/61.11 D, 61.12 M, 61.7 B

[56] References Cited

UNITED STATES PATENTS 3,571,799 3/1971 Coker .......................... 235/61.11 D
3,627,994 12/1971 Sallach .......................... 235/61.7 B

FOREIGN PATENTS OR APPLICATIONS 1,020,696 2/1953 France ..................... 179/100.2 CA

*Primary Examiner*—Maynard R. Wilbur
*Assistant Examiner*—Robert F. Gnuse
*Attorney*—Kenneth L. Miller and Charles S. Hall

[57] ABSTRACT

An apparatus for reading or writing a line of electromagnetically encoded information across a stationary card. A resilient card aligning cam urges the card against a reference edge while a read/write head traverses the card, the cam having a ramp for preventing the head from catching the edge of the card as it moves from its rest position. The head is mounted by a single bolt through a head holder, the bolt being centered in complementary curved surfaces of the head and head holder for adjustability of the head.

7 Claims, 4 Drawing Figures

INVENTORS
NICHOLAS KONDUR, JR. &
LAWRENCE P. KOBYLARZ

BY [signature]
ATTORNEY

INVENTORS
NICHOLAS KONDUR, JR. &
LAWRENCE P. KOBYLARZ

BY [signature]
ATTORNEY

ELECTROMAGNETIC READ/WRITE APPARATUS FOR STATIONARY CARDS

BACKGROUND OF THE INVENTION

The present invention relates to an apparatus for reading information from and writing information on a magnetic strip across a stationary credit or identification card.

The credit card and other types of identification cards have become an important factor in the business, security and social fields. Their increased use and importance, however, have given rise to problems in providing rapid and reliable handling at a reasonable cost.

Until recently it has been the practice to process the cards manually. Although manual handling may be reliable, the paper work generated in a credit card purchase, for example, does not lend itself to the rapid debiting of a customer's account at a reasonable cost.

With the advent of modern central computer systems, a faster and less expensive method of debiting or crediting customer's accounts was found. Manual handling of the credit and identification card, however, does not lend itself to such a system since it requires an electrical signal as an input.

Automatic card readers were designed to read information from a card and pass that information on to a central computer in the form of electrical signals. The card readers of the prior art, however, are of a complex nature and, therefore, expensive to manufacture and maintain. Because of these drawbacks, they have not been widely used despite the great need.

It is, therefore, an object of this invention to provide a reliable, sturdy and uncomplicated automatic device for processing a card bearing a strip of electromagnetic media containing coded information thereon.

It is a further object of this invention to provide a card reader that permits adjustment of the read/write mechanism for proper alignment by a single simple operation.

It is another object of this invention to provide a card reader that does not require frequent head alignment.

SUMMARY OF THE INVENTION

These objects and the general purpose of this invention are accomplished by an electromagnetic apparatus wherein a read/write head traverses a stationary card along its information bearing magnetic strip when the card is properly inserted in the apparatus. The head is mounted in a head holder by a single bolt centered in complementary curved surfaces on the head and holder for easy adjustment. A camming element, besides urging the card into an aligned location, prevents the head from being dislodged from its adjusted position or damaging the card as the head leaves its rest location.

BRIEF DESCRIPTION OF THE DRAWINGS

The advantages of this invention will be readily appreciated as the invention becomes better understood by reference to the following detailed description considered in connection with accompanying drawings in which like reference numerals indicate like parts throughout the figures thereof and wherein.

DESCRIPTION OF THE PREFERRED EMBODIMENT

Figure 1:
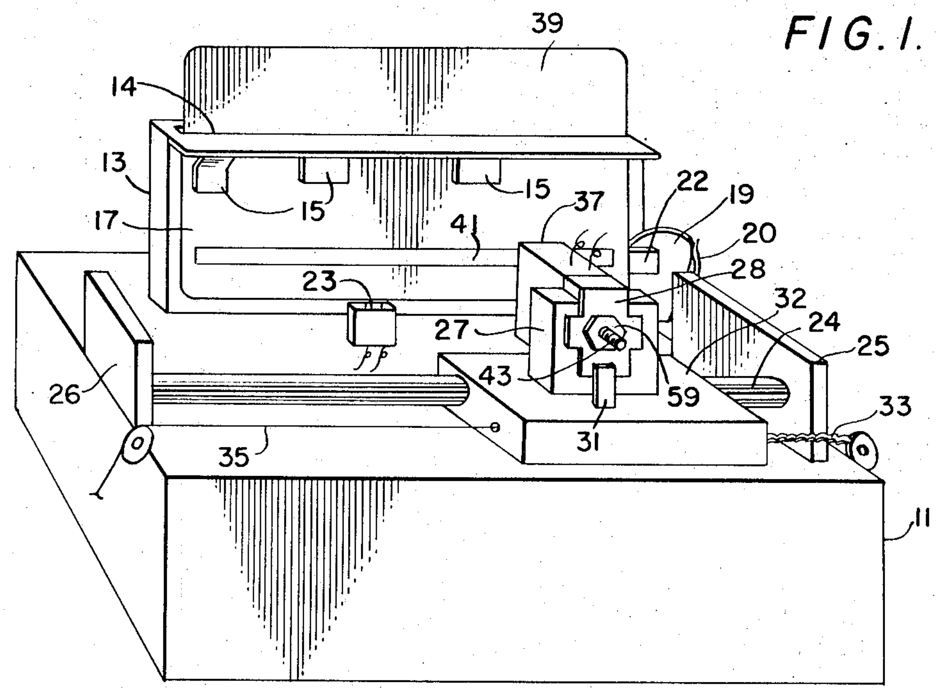
FIG. 1 is a perspective view of the preferred embodiment of this invention.

FIG. 1 shows a magnetic read/write head 37 and a card holder 13 mounted in opposed relation on base 11. Card holder 13 has a horizontal slot 14 and depending fingers 15, which could be located on both sides of card 39, for guiding and maintaining card 39 in proper position for processing. The inserted card is urged, horizontally, against reference surface 17 of card holder 13 by card aligning cam 19 and cam loading spring 20, which will be described hereinafter in detail.

Card 39, which is the type processed by this invention, has a strip of magnetic material 41 across its face parallel to two sides of the card. The card is oriented in card holder 13 so that strip 41 is parallel to the upper surface of base 11. When card 39 is fully inserted in slot 14, the lower edge of the card activates a switch 23 which may give a signal that the device is ready for use or may, if desired, trigger the operation of the read/-write head.

Head 37 is mounted on base 11 for movement across the surface of card 39 in close proximity to magnetic strip 41. Head 37 is positioned in head holder 28 by means hereinafter described. Head holder 28 may be removably attached to head carrier 27 which is supported by transport platform 32 that rides on one or more shafts 24 which in turn are supported at their opposite ends by plate members 25 and 26 attached to base 11. Head carrier 27 may be an integral part of transport platform 32 or may be detachably connected thereto, as desired.

Drive wire 35, acting under any convenient power source (not shown), preferably mounted in base 11, on signal, pulls the platform 32 along shaft 24, whereby head 37 traverses magnetic strip 41. Platform 32 is pulled against the bias of spring 33 which returns the carrier to its rest position after head 37 has traversed the card.

Head 37 is attached to head holder 28 by a bolt 43 that is a part of head 37 and extends through an aperture 57 in holder 28. The head is retained in position by a nut 59 that is threaded on bolt 43 until it abuts the backside of holder 28.

Figure 2:
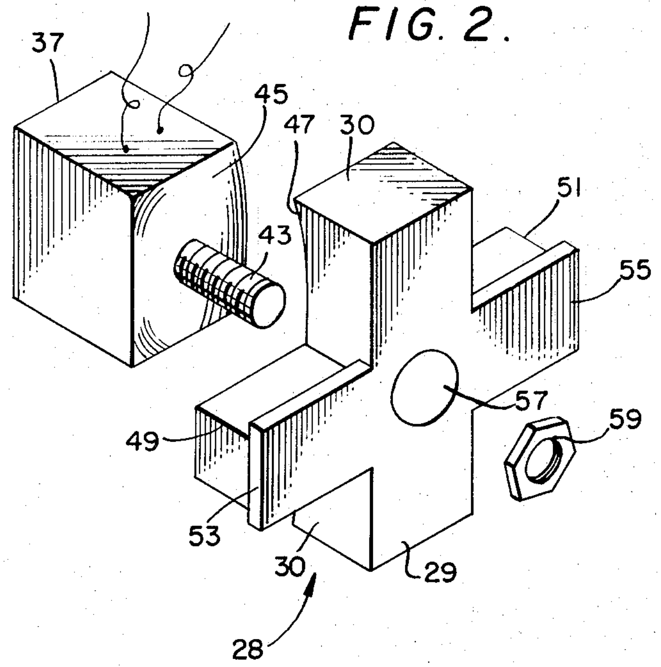
FIG. 2 is an exploded perspective view of an embodiment of the magnetic head and head holder.

A preferred relationship of head 37 and head holder 28 is shown in FIG. 2. Head 37 has threaded bolt 43 formed as part of curved surface 45 of head 37. Preferably, bolt 43 is located at the geometric center of curved surface 45 which is spherically convex. Surface 45 and bolt 43 mate with spherically concave surface 47 of head holder 28 and aperture 57 which is at the geometric center of surface 47. Since aperture 57 is larger in diameter than bolt 43, head 37 may be manipulated in any direction emanating from and perpendicular to its central axis. It is apparent that complementary curved surfaces 45 and 47 need not be spherical, but may be any appropriate curved contour.

Nut 59, when threaded on bolt 43 to abut against backside 29 of head holder 28, will retain head 37 in any position in which it is set. Backside 29 may be curved to match the curvature on head surface 45 or it may be flat as shown. In case backside 29 is flat, in order for head 37 to be securely held in its adjusted position, nut 59 must be tightened on bolt 43 so that it slightly deforms or bites into backside 29.

Head holder 28 is preferably formed in the shape of a cross with horizontal and vertical arms for proper alignment of the head holder in carrier 27, the latter being provided with a correspondingly shaped cut-out portion.

The curved face 47 of head holder 28 may be restricted to the vertical arms 30, as shown in FIG. 2, or encompass both the vertical arms and horizontal arms 49 and 51. The horizontal arms serve as alignment tongues for placing head 37 in a horizontal plane that intersects magnetic strip 41 and prevent head holder 28 from rocking transversely when held by carrier 27.

Stop tabs 53 and 55 may be an integral part of alignment arms 49 and 51, as shown in FIG. 2, or they may be attached to arms 49, 51 and 30 or just to arms 49 and 51. The arms of head holder 28 slide into the corresponding cut-out portion in carrier 27 and the tabs 53, 55 fit flush against the back surface of the carrier precisely defining the gap between the head 37 and the magnetic strip 41. A retaining spring 31 (shown in FIG. 1) maintains the holder 28 in its mounted position, and serves to maintain the head in the desired contacting relationship with the strip throughout its transverse movement, despite variations in card thickness or in the contour of the strip.

Figures 3, 4:
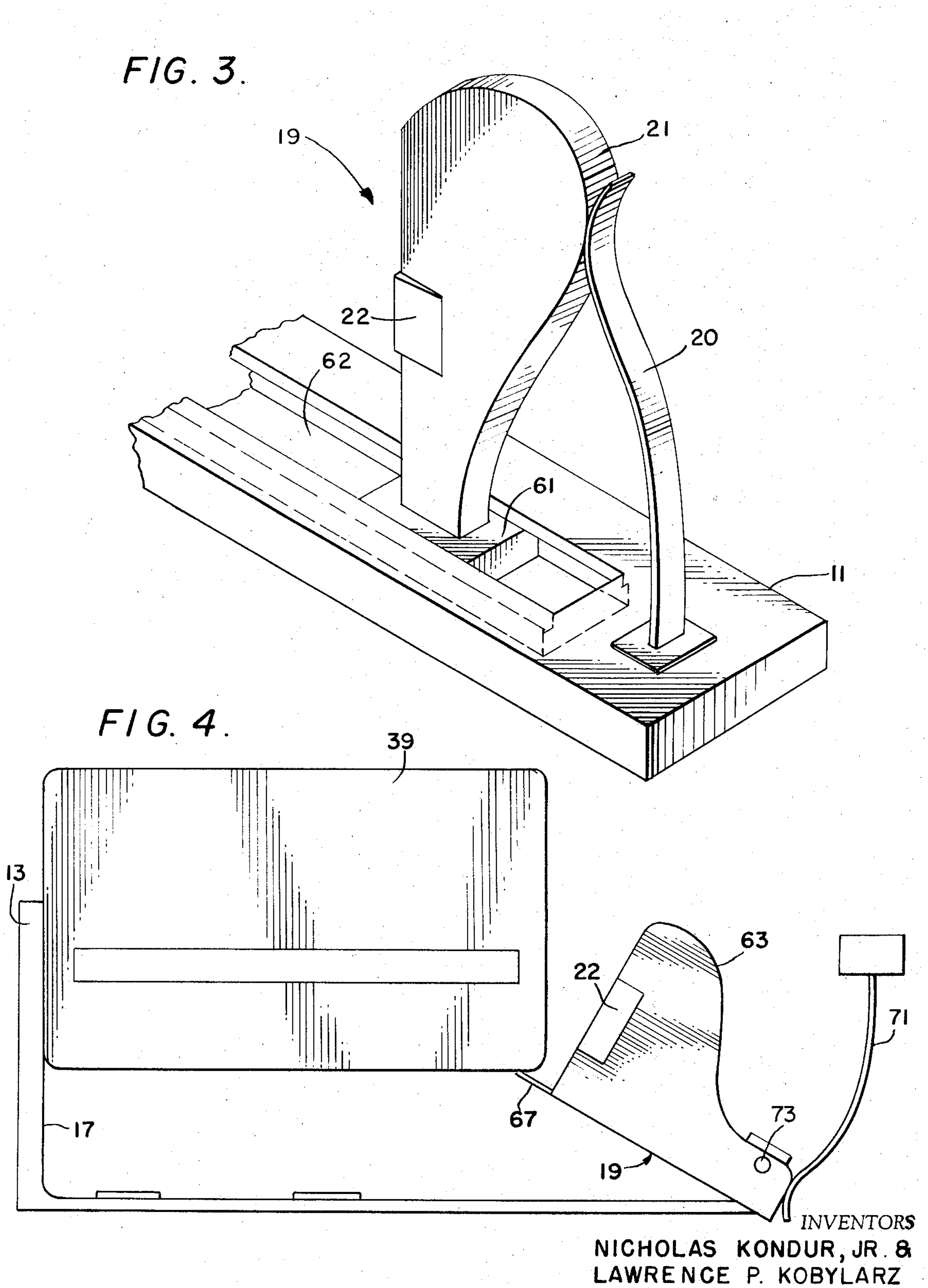
FIG. 3 illustrates one embodiment of the card aligning cam.
FIG. 4 illustrates another embodiment of the card aligning cam.

We refer now to FIGS. 3 and 4 for a description of alternate embodiments of alignment cam 19 which was mentioned in connection with FIG. 1 as urging card 39 against a reference surface 17 on card holder 13.

FIG. 3 shows one embodiment of alignment cam 19, as having a cam body member 21 bearing a head ramp 22, at a location on body 21 to overlay the path of travel of head 37, and of sufficient height to prevent the head from catching the edge of the card as the head leaves its rest position. Body member 21 moves by means of sliding base 61 which may ride in groove 62 formed in base 11. Body member 21 is urged in a card-abutting direction by cam loading spring 20, thereby, in turn, urging a card 39 against reference surface 17 (FIG. 1).

FIG. 4 shows an alternate embodiment of an alignment cam 19 as having a body member 63 with a head ramp 22 mounted thereon and a positioning tab 67 at a bottom edge of one end of member 63. Body member 63 is shaped and supported to provide movement around pivot point 73 when a downward force is exerted on positioning tab 67 by the edge of card 39. A torsion spring 71 is used to pivot member 63 in a clockwise direction around point 73, which may be pinned to any convenient support member.

In operation, the alignment cam of FIG. 4 would function in the following manner. The bottom corner of card 39, upon being inserted into the card holder 13, would exert a downward force on tab 67 causing cam 63 to pivot around point 73 in a counterclockwise direction to bring head ramp 22 into a position that overlays the path of travel of the read/write head and, maintain the card against reference surface 17.

From the foregoing description, it can be seen that the read/write apparatus of this invention would function as a card reader in the following manner. When a card, such as 39, is inserted into card holder 13, it is correctly aligned by depending fingers 15, reference surface 17 and aligning cam 19. Also, switch 23 is actuated preferably causing head 37 to leave its rest location and traverse the card. Because of ramp 22, head 37 will not catch the edge of the card as the head leaves its rest location. The head will read the data stored on magnetic medium 41 as controlled by well-known electronic circuits (not shown) connected to the head.

When functioning as an information writer, the apparatus would function in substantially the same manner as above described except that well-known electronic circuits (not shown) connected to the head would generate data and control head 37 to deposit such data on magnetic strip 41.

This invention, therefore, provides a sturdy, and uncomplicated read/write apparatus for stationary cards that automatically processes a card bearing a strip of electro-magnetic media, permits adjustment of the read/write mechanism by a single simple operation, and prevents the read/write mechanism from being knocked out of adjustment. It should be understood that the foregoing disclosure relates only to a preferred embodiment of the invention and that numerous modifications may be made thereon without departing from the spirit and the scope of the invention as set forth in the appended claims.

What is claimed is:

1. Apparatus for reading and writing information on a strip of magnetic media carried by a card comprising:

a card holder having a recess with a reference surface at one end for receiving a card;

aligning cam means located at one end of said card holder opposite the reference surface and having an elongated flat surface for contacting a substantial portion of an edge of the card inserted into said holder and for uniformly urging the card toward the reference surface;

a head for reading or writing magnetically stored information; and means for advancing said head along said magnetic strip, said cam means having head ramp means for overlaying the path of travel of said head as it begins to advance.

2. The apparatus of claim 1 wherein said aligning cam means comprises:

a body member slidably urged into contact with a card in said holder; and a head ramp mounted on said body member for overlaying the path of travel of the read/write head, as it begins to advance.

3. The apparatus of claim 1 wherein said aligning cam means comprises:

a body member pivoted against bias by the insertion of a card into said holder; and a head ramp mounted on said body member for abutting the edge of the card and overlaying the path of travel of said head as said head begins to advance along said strip.

4. The apparatus of claim 1 also including means for adjustably mounting said head on said advancing means, said mounting means providing limited rotary movement of said head in every direction.

5. The apparatus of claim 4 wherein said mounting means comprises:

a curved surface on said head;

a bolt fixed in the geometric center of said curved surface on said advancing means complementary to said curved surface on said head and having an aperture therethrough at its geometric center for receiving said bolt; and means for maintaining said bolt in a selected position in the aperture.

6. The apparatus of claim 5 wherein said advancing means comprises:

a horizontal shaft;

carrier means slidably mounted on said shaft; and means separable from said carrier means for holding said head.

7. The apparatus of claim 6 wherein said separable means comprises:

a block having intersecting arms and bearing said complementary curved surface with said aperture at the intersection of said arms.

* * * * *